United States Patent [19]
Shrim et al.

[11] Patent Number: 6,057,052
[45] Date of Patent: *May 2, 2000

[54] CELL FOR A METAL-AIR BATTERY

[75] Inventors: Yaron Shrim; Vladimir Schneider; Alex Gutkin; Yoel Gilon, all of Jerusalem, Israel

[73] Assignee: Electric Fuel (E.F.L.) Ltd., Jerusalem, Israel

[ * ] Notice: This patent is subject to a terminal disclaimer.

[21] Appl. No.: 09/033,725

[22] Filed: Mar. 3, 1998

Related U.S. Application Data

[63] Continuation-in-part of application No. 08/987,518, Dec. 9, 1997, Pat. No. 5,904,999, which is a continuation-in-part of application No. 08/451,012, May 25, 1995, Pat. No. 5,753,384.

[51] Int. Cl.$^7$ ...................................................... H01M 8/04

[52] U.S. Cl. .............................. 429/27; 429/34; 429/38; 429/39

[58] Field of Search .................................. 429/27, 26, 34, 429/38, 39, 72

[56] References Cited

U.S. PATENT DOCUMENTS 5,366,822  11/1994  Korall et al. .............................. 429/27
5,447,805   9/1995  Harats et al. ............................. 429/27

*Primary Examiner*—John S. Maples
*Attorney, Agent, or Firm*—Helfgott & Karas, PC.

[57] ABSTRACT

The invention provides a modular zinc air cell for use in an electrochemical zinc-air multi-cell battery, each cell being of the type provided with a housing having, two outer major surfaces, and two spaced-apart inner walls, the inner walls defining a first inner chamber for containing therein a zinc electrode, and in conjunction with the outer major surfaces defining two outer chambers for receiving reaction air; two generally planar, gas-permeable, but liquid-impermeable air electrodes, each of the electrodes being installed in a window-like opening provided in each of the inner walls, an electrolyte in contact with the zinc electrode and the air electrodes, and means for directing a flow of the reaction air into a first inlet provided in a first outer side surface of the housing through both of the outer chambers substantially in a uniform flow distribution across the outer faces of both of the air electrodes, and out of a second outlet provided in an opposite outer side surface of the housing.

13 Claims, 4 Drawing Sheets

CELL FOR A METAL-AIR BATTERY

BACKGROUND OF THE INVENTION

The present specification is a continuation in part of U.S. Ser. No. 08/987,518, filed Dec. 9th, 1997, now U.S. Pat. No. 5,904,999, which in turn is a continuation in part of U.S. Ser. No. 08/451,012, filed May 25th 1995, now U.S. Pat. No. 5,753,384.

The present invention relates to a modular cell for a multi-cell metal-air battery system, more particularly for such a system to be used in electrically powered vehicles.

In U.S. Pat. No. 5,366,822, there is described and claimed a modular cell for a multi-cell metal-air battery system, comprising a relatively flat cell housing having two major surfaces and accommodating a pair of oppositely disposed, spaced-apart, air-permeable, liquid-impermeable cathodes in the form of air electrodes defining between themselves a space open towards the upper edges of said cell housing and closed at the lateral edges and the bottom of said cell housing, said space being configured to accommodate an anode of said battery, substantial portions of the major surfaces of said housing being removed, thus exposing major portions of said air electrodes, characterized in that said two major surfaces are partly recessed in such a way as to form, in conjunction with a similarly recessed outer surface of a major wall of an adjacent cell housing, an air space with air access and exits, and that the exposed portions of said air electrodes are supported and reinforced by ribbing constituted at least by a plurality of slender rails, which rails define ducts for guiding a flow of air across said portions of said air electrodes from said air access toward said exits.

The teachings of said patent and the state of the art as reflected therein is incorporated herein by reference.

Based on the basic modular design described in said patent, batteries for electrical vehicles were prepared and tested and have achieved significant results in powering motor vehicles at speeds of up to 100 kmh for distances up to 400 km without the need for recharging of the batteries.

Cooling systems for such batteries are described and claimed in U.S. Pat. No. 5,447,805, which is directed to a modular cell for a multi-cell metal-air battery system, comprising a relatively flat cell housing having two major surfaces and accommodating a pair of oppositely disposed, spaced-apart, air-permeable, liquid-impermeable cathodes in the form of air electrodes defining between themselves a space open towards the upper edges of said cell housing and closed at the lateral edges and the bottom of said cell housing, said space being configured to accommodate an anode of said battery and electrolyte, substantial portions of the major surfaces of said housing being removed, thus exposing major portions of said air electrodes, characterized in that said two major surfaces are partly recessed in such a way as to form, in conjunction with a similarly recessed outer surface of a major wall of an adjacent cell housing, an air space with air access and exits, and that the exposed portions of said air electrodes are supported and reinforced by ribbing constituted at least by a plurality of slender rails, which rails define ducts for guiding a flow of air across said portions of said air electrodes from said air access toward said exists, and further characterized in that an upper portion of at least one major surface of said housing is provided with a fluid flow channel having an inlet and an outlet provided in a wall of a minor surface of said housing for guiding a cooling fluid introduced into said inlet across an upper area of said cell, in heat exchange with electrolyte contained in upper portions of said open space, via an inner wall of said housing portion.

In U.S. Ser. No. 08/451,012 there is described and claimed an electrochemical zinc-air multi-cell battery, each cell being of the type provided with a housing having a base and two major surfaces and two minor surfaces defining an interior space for containing therein a zinc electrode; at least one generally planar gas-permeable but liquid-impermeable air electrode, each of said least one air electrode being installed in a window opening provided in at least one of the major surfaces; an electrolyte in contact with said zinc electrode and said air electrode; means for directing a flow of reaction air from a scrubber across the outer faces of two adjacently interfacing air electrodes; and cooling-air, flow-directing means comprising a pair of spaced-apart plates positioned between adjacent cells, each plate being substantially the same size as said major surfaces for forcing cooling-air to flow between said pair of plates, the outer faces of said plates being arranged to be in contact with and to cool said reaction air.

The modular cell of U.S. Pat. No. 5,366,822 consisting of a split cell housing, wherein the two housing halves were exactly identical and were cemented together during the assembly of a cell with a seam formed along the periphery of the cell, i.e. along the joined sides, including top and bottom sides, thereof.

This type of peripheral side-by-side welding of two housing halves, however, was found to be somewhat problematic as far as leaks were concerned.

Furthermore, the arrangement for directing reaction air across the outer faces of two interfacing air electrodes open to the housing of the battery necessitated the preparation and usage of large volumes of scrubbed reaction air.

In addition, the fabrication of said cells, including the alignment of the two symmetrical half cells for gluing was mechanically difficult.

Another problem encountered was that the electrical interconnection between the current collectors of adjacent cells was exposed and subject to damage, as well as short circuiting.

SUMMARY OF THE INVENTION

According to the present invention, there is now provided a modular cell for use in an electrochemical zinc-air multi-cell battery, each cell being of the type provided with a housing having two outer major surfaces, and two spaced-apart inner walls, said inner walls defining a first inner chamber for containing therein a zinc electrode, and in conjunction with said outer major surfaces defining two outer chambers for receiving reaction air; two generally planar gas-permeable, but liquid-impermeable air electrodes, each of said electrodes being installed in a window-like opening provided in each of said inner walls; an electrolyte in contact with said zinc electrode and said air electrodes; and means for directing a flow of said reaction air into a first inlet provided in a first outer side surface of said housing through both of said outer chambers substantially in a uniform flow distribution across the outer faces of both of said air electrodes, and out of a second outlet provided in an opposite outer side surface of said housing.

In preferred embodiments of the present invention the modular cell is formed from assymetric split cell halves, wherein a first of said inner walls is provided with a frame-like opening sized to receive and accommodate, in tight friction fit, a second of said inner walls, a bottom and opposing side surfaces of said first inner wall forming the base and sides of said housing respectively and a top portion of said first inner wall constituting a seamless upper portion of the assembled cell.

In especially preferred embodiments of the present invention, each of said inner walls is provided with a peripheral recess sized to accept one of said two outer major surfaces and a window-like opening sized to accept one of said two air electrodes, each of said recesses and each of said openings serving to position one of said electrodes and one of said surfaces and to facilitate the formation of an air-impermeable joint between said outer surfaces and said peripheral recesses.

Preferably said cell is provided with a single inlet and a single outlet for reaction air and said means for directing said flow of reaction air substantially in a uniform flow distribution across said outer faces of both of said air electrodes comprises a series of substantially horizontal rails supported in said window-like opening in said inner wall, the spaces formed between said rails defining upper and lower walls of horizontal ducts directing said reaction air received from said single inlet towards said single outlet.

It will be appreciated that in contradistinction to the design originally contemplated by U.S. Pat. No. 5,366,822, and the further patents based thereon, the modular cell of the present invention is self-contained with many advantages over that of said previous cell. More specifically, in the previous cell design and the batteries based thereon, reaction air passed between two adjacent cells from a common manifold and if a leak occurred in any cell, electrolyte would then enter into said common manifold.

Furthermore, the air electrodes while partially protected by the supporting and reinforcing ribs positioned on the outer surfaces thereof, nevertheless were subject to damage when an entire cell was withdrawn from the battery for replacement.

In contradistinction thereto, the present invention provides for the first time a self-contained cell, wherein the air electrode is positioned in an internal wall of said double-walled cell and reaction air circulates within each cell, in a reaction air chamber formed by said double walls, between respective surfaces of adjacent inner and outer walls, rather than between adjacent cells.

In the present invention, cooling of the individual cells can preferably be carried out in the manner described in U.S. Ser. No. 08/987,518, the teachings of which are incorporated herein by reference, i.e. by further providing said cells with cooling air flow directing means for causing cooling air to flow between two adjacently positioned cells, along the outer faces of the major surfaces of two interfacing adjacent cells, said surfaces respectively being arranged to be in contact with and to cool said reaction air in each of the outer chambers bounded by said respective surfaces.

It will be appreciated that batteries formed from cells according to the present invention have arrangements for two separate air flows, heat being transferred from the reaction air to the cooling air. The two air flows may, however, originate from a single air blower, or preferably from separate sources in order to allow for the use of lower quantities of scrubbed reaction air. Reaction air is supplied in sufficient quantity to operate the battery, while a larger quantity of cooling air is used to extract unwanted heat from the reaction air.

In especially preferred embodiments of the present invention said outer major surfaces of the housing are made of plastic material. It is to be noted that plastics are usually not considered as suitable candidates for use in heat-exchange applications, as metals have heat conductivities which are approximately a thousand times larger than typical solid plastics. This consideration is, however, based on an over-simplified view of what actually transpires when heat is transferred by conduction through a wall. Both the hotter and the cooler surface of the wall are covered by a thin film of the respective medium, air in the present application, in contact which such a wall. The value of the film coefficient depends on many factors, among them thermal conductivity, viscosity, density and specific heat. Precise calculations are complex, but, as a rule, unless flow is turbulent and the heat exchange wall is thick, the resistance to heat flow of each single film is typically many times greater than the resistance of the solid material comprising the wall; there are, of course, two such air films, and the thin film of still air which is in close contact to the wall is a very poor heat conductor.

This consideration is of particular effect in the present invention, where the wall thickness of said outer major surface is very small, approximately one millimeter, and due to limitations on blower power consumption, air flows are expected to be laminar. The end result is that when total heat resistance is considered, and not merely the heat conductivity of the wall material, a thin wall made of a solid plastic is only moderately inferior to a metal in this application.

Plastics have several compensating attractive properties for use in the outer surfaces of the housing in the present invention, such as high electrical resistance, light-weight, low fabrication costs and excellent resistance to chemical attack by the alkaline medium prevalent in batteries of the type described. For example, in comparing an equal thickness of copper to polypropylene, the plastic offers a weight advantage of a factor of 9.9. Such an advantage is of considerable importance in a battery intended for road vehicle propulsion, wherein low weight is a crucial requirement for attaining acceptable vehicle performance.

In especially preferred embodiments of the present invention, said zinc-electrode is formed of a generally planar electrically conductive skeletal member encompassed by an active metal component, comprising porous zinc particles formed into a static bed of slurry impregnated with an electrolyte and said interior space of said housing communicates with an opening opposite said base through which said zinc electrode is removable to enable the mechanical replacement thereof with a freshly charged metal electrode.

In U.S. Pat. No. 5,354,625 there is described and claimed a metal-air power supply and air-manager system and a metal-air cell for use therein. However said patent teaches a zinc-air cell with an air electrode cathode on top and a solid cell case on the bottom, wherein the reaction air is directed to a cathode plenum above the top of the cell, while the cooling air is directed to a cooling-air plenum at the bottom of the cell. Thus, it is clear that this patent does not teach or suggest the use of cooling air to cool reaction air, but rather directs the cooling air to a different face of the cell, i.e. one which has no air cathode.

As stated specifically in column 6, lines 6–13 of said patent, "In addition, the stackable tray registers of the cell are formed within the component so the cell cases and the trays form a cathode plenum in each compartment adjacent to the respective air cathode and a cooling air plenum isolated from the air cathode, whereby reactant air may be directed against the air cathodes and cooling air may be directed against a portion of each cell case isolated from the respective air cathode".

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

DESCRIPTION OF THE INVENTION

Figure 1:
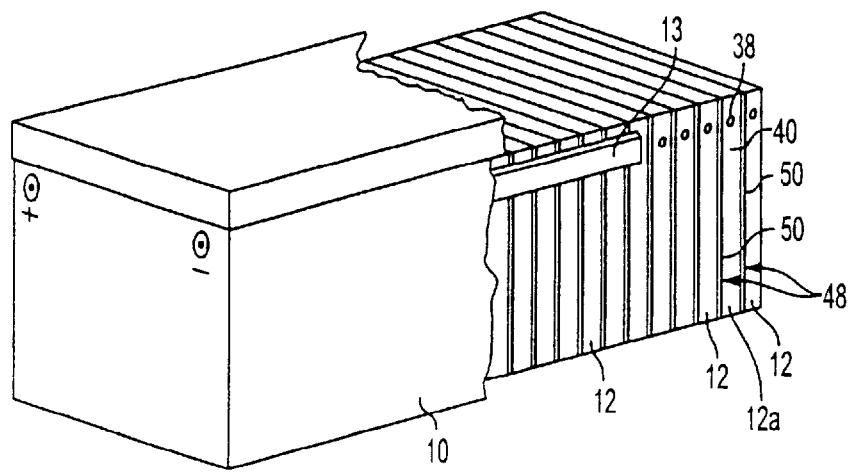
FIG. 1 is a perspective, non-detailed fragmented view of a preferred embodiment of a battery incorporating a plurality of modular cells according to the invention.

There is seen in FIG. 1 an electrochemical zinc-air multi-cell battery 10, of the type used for multiple discharge and recharge cycles. Battery 10 contains many cells 12, 12a, and is suitable for vehicle propulsion. A manifold 13 feeds reaction air to each of a series of cells within the battery.

Figure 2:
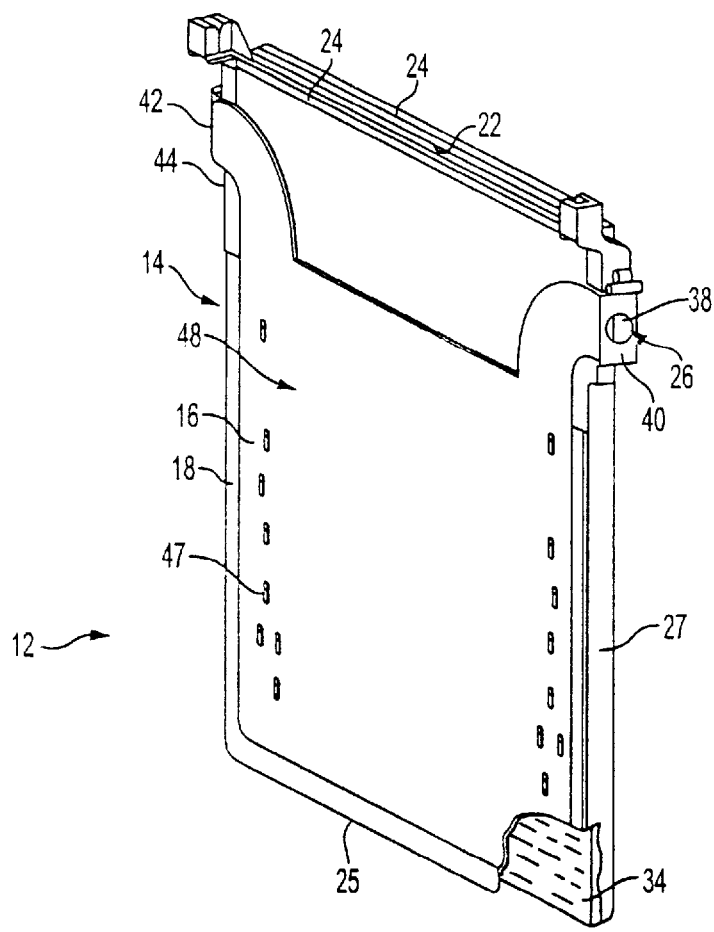
FIG. 2 is a perspective, fragmented view of an assembled cell, showing contained electrolyte.
Figure 3:
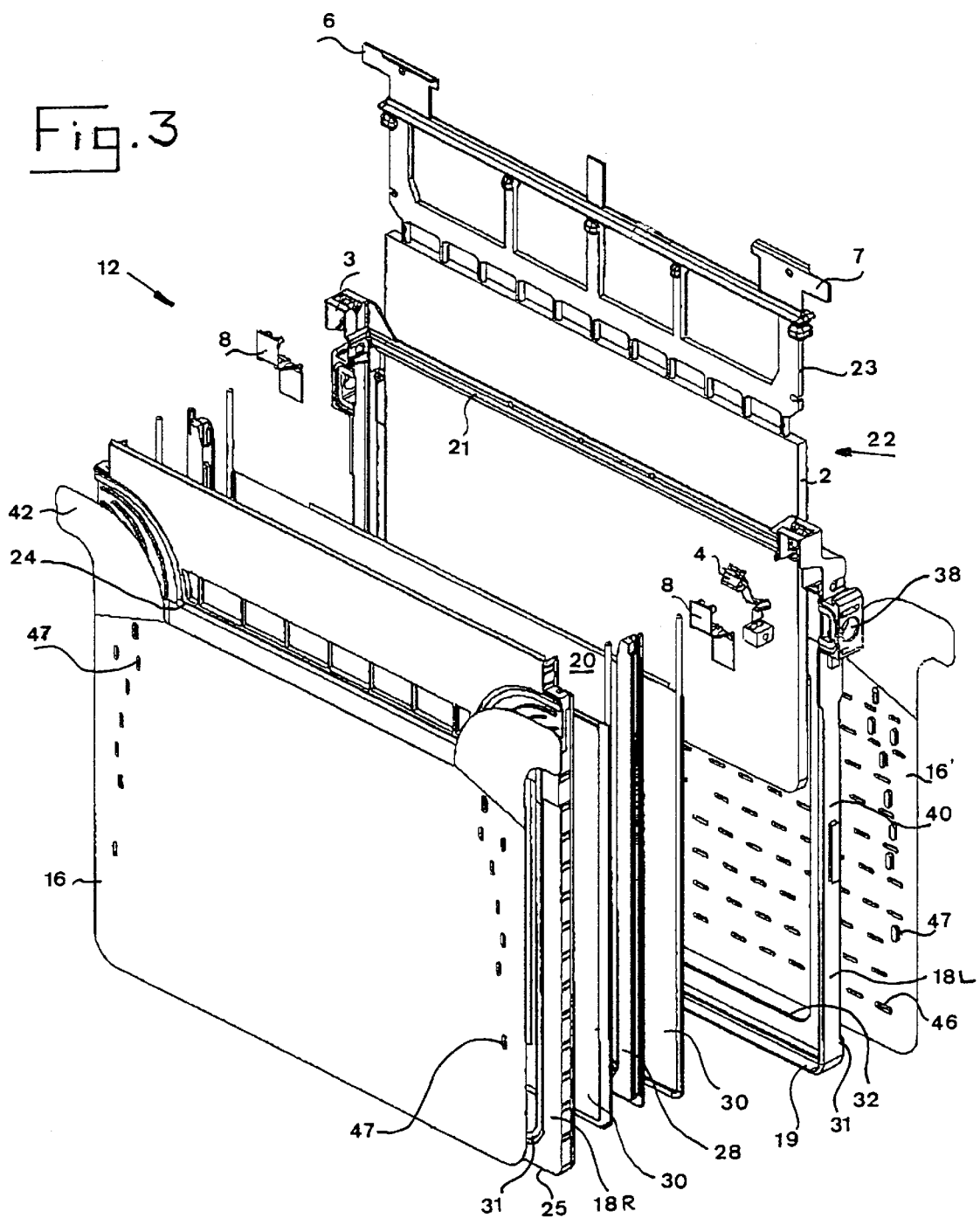
FIG. 3 is an exploded view of the cell shown in FIG. 2.

Referring now to FIGS. 2 & 3, there is seen in more detail one of the battery cells 12 contained in battery 10.

The cell 12 has a housing 14 having two outer major surfaces 16 and 16' and two spaced-apart inner walls 18. Inner walls 18 define a first inner chamber 20 for containing therein a zinc electrode 22, and in conjunction with outer major surfaces 16 define two outer chambers 24 for receiving reaction air 26.

In the embodiment more clearly seen with reference to FIG. 3, a first of said inner walls 18L is provided with a frame-like opening 19 sized to receive and accommodate, in tight friction fit, a second of said inner walls 18R, a bottom 25 and opposing side surfaces 40 and 44 of said first inner wall 18L forming the base and sides of said housing 14 respectively and a top portion 21 of said first inner wall constituting a seamless upper portion of the assembled cell.

Zinc electrode 22 is advantageously formed of a generally planar electrically conductive skeletal member 23 encompassed by an active metal component 2, comprising porous zinc particles formed into a static bed of slurry impregnated with an electrolyte. The zinc electrode 22, when in place, is retained in a un-shaped frame 28 and can be withdrawn and replaced by a new zinc electrode 22 when the used electrode is exhausted.

Figure 3A:
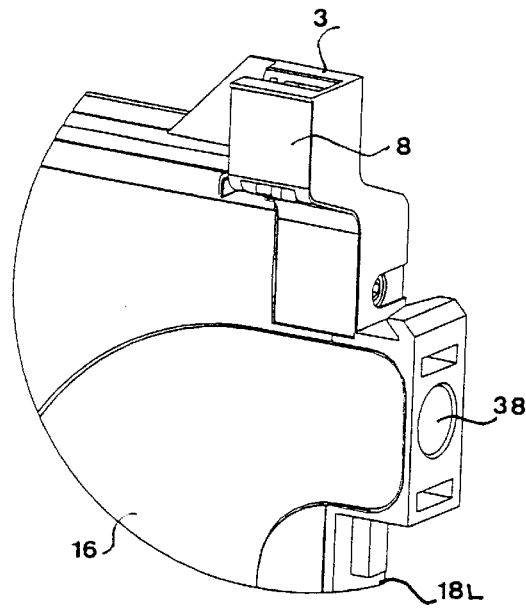
FIG. 3a is a perspective view of an upper corner of the cell of FIG. 2.
Figure 3B:
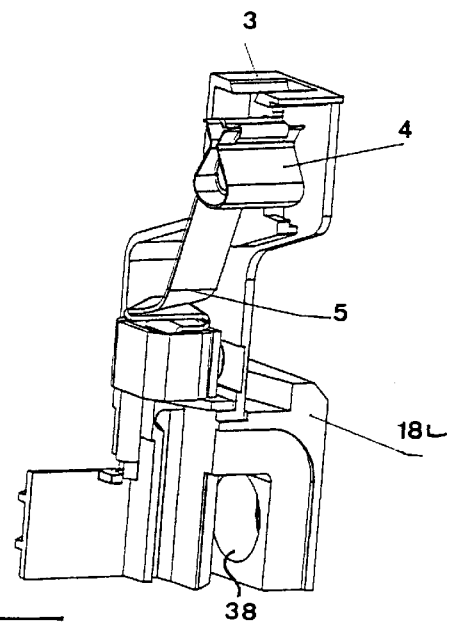
FIG. 3b is a perspective view of an upper corner of the cell of FIG. 2, with the closure element removed therefrom.
Figure 3C:
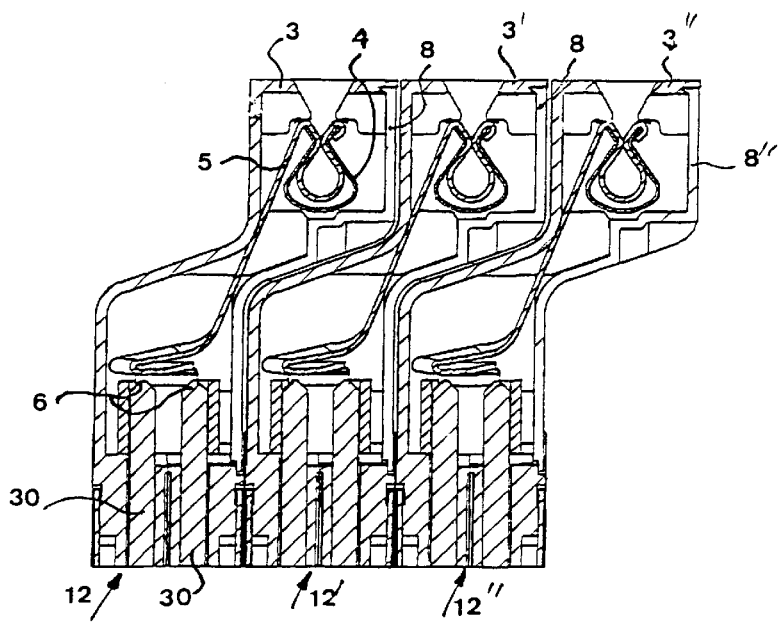
FIG. 3c is a cross-sectional side view of three nested cells.

As seen in FIG. 3, which is to be viewed in conjunction with FIGS. 3a, 3b and 3c, inner wall 18L is provided with an integral cell contact housing 3, which contains a spring clip contact 4, electrically connected via a metal conductor 5 to the contacts 6 of the air electrode, said clip contact 4 being adapted to receive flanges 7 extending from the anode current collector member 23 of an adjacent cell due to the stepped nesting configuration of the contact housings 3, 3' and 3" of adjacent cells 12, 12' and 12", as seen in FIG. 3c.

Housing 3 is sealed by closure 8, thereby better protecting spring clip 4 and flange 7 from exposure, said housing 3 and said closure 8 being preferably formed of non-conductive KOH-resistant plastic.

As will be realized, the present arrangement allows for internal electrical interconnection between adjacent cells, rather than external connection, as provided by terminal clips 48 seen in FIG. 1 of U.S. Pat. No. 5,447,805.

Outer surfaces 16 and 16' comprise plastic sheets 0.3 to 1.5 mm thick of sufficient strength for protection of air electrode 30 from physical damage during cell handling. Preferred plastics include noryl and polypropylene, due to their light weight and excellent chemical resistance.

Two generally planar gas-permeable, but liquid-impermeable air electrodes 30 are positioned, one on each side of the zinc electrode 22. Each air electrode 30 is installed in a window-like opening 32 provided in each inner wall 18.

Each inner wall 18 is provided with a peripheral recess 31 sized to accept one of two outer major surfaces 16 and a window 32 to accept one of two air electrodes 30. The recesses 31 serve to position outer surfaces 16 and 16', seen in FIG. 3, and to facilitate the formation of an air-impermeable joint between outer surfaces 16 and 16' and peripheral recesses 31. Said joint can be made by using epoxy glue or by ultrasonic welding. Alternatively, major outer surfaces 16 and 16' and inner walls 18 can be molded as a single integral unit.

An electrolyte 34, for example potassium hydroxide, is held in the first inner chamber 20 and contacts the zinc electrode 22 and air electrodes 30.

To provide oxygen required for cell operation, means are provided for directing a flow of reaction air 26 from a first inlet 38 provided in a first outer side surface 40 of the cell housing 14. Reaction air flow divides to pass through both outer chambers 24 substantially in a uniform flow distribution across the outer faces of both air electrodes 30. Reaction air 26, minus the consumed oxygen, exits through a second outlet 42 provided in an opposite outer side surface 44 of the cell housing 14.

Reaction air 26 passing through the cell 12 is significantly heated in the cell 12 due to contact with the hot air electrode 30.

As stated, in the present invention, the heated reaction air 26 may be cooled by cooling air 48 (as represented in FIG. 1), which flows along the outer surfaces 16 and 16' of each cell and effects cooling by heat transfer through said outer surfaces and preferably said reaction air and said cooling air flow in counter-current direction to each other.

In the embodiment shown, cooling air flow directing means include a plurality of outward projections 46 which are provided on at least one of the outer surfaces, in the present embodiment shown only on rear outer surface 16'. Projections 46 act as spacers between adjacent cells and allow cooling air 48 to flow through a space 50, seen in FIG. 1 between two adjacently positioned cells 12 and 12a. For this reason it is sufficient to place projections 46 on only one of said interfacing outer surfaces, although obviously it is possible to provide such projections on both outer surfaces 16 and 16'.

Cooling air 48 does not enter the cell 12, but contacts the two interfacing outer major surfaces 16 and 16' of two interfacing adjacent cells 12 and 12a. Surfaces 16 and 16' are arranged to be in contact with and to cool reaction air 26 in each of the outer chambers 24. Thus, even though high flow rates of cooling air 48 are used, no carbon dioxide contamination of the cell 12 results therefrom. Cell heat is thus removed partially through the reaction air 26 directly, and partially through the cooling air 48 removing heat from the cell outer surfaces 16 and 16'. In a battery having cells 24 cm square, a minimum of 50 watts of heat is removed from each cell 12.

It will be realized that batteries according to the present invention, can also be used for motorcycles and other vehicles in situations wherein cooling air can flow between adjacent cells, as a result of air flow along the battery and between the cells as a result of the vehicle's motion, wherein such spacers or projections 46 are the only means necessary for directing cooling air flow between adjacent cells, while in other closed embodiments said means may include ducts, vents, blowers, and combinations thereof, etc.

Preferably, there are also provided on both of said outer surfaces 16 and 16' inwardly directed projections 47, which further assure the maintenance of the space within outer reaction chambers 24 for the flow of said reaction air, as described hereinbefore.

Figure 4:
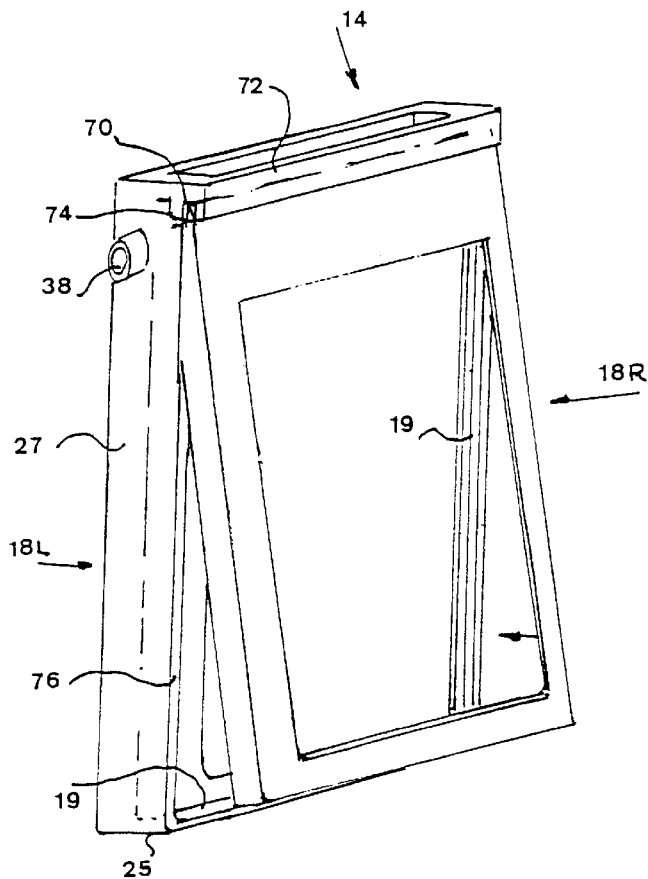
FIG. 4 is a view of a cell detail of two spaced-apart inner walls during assembly to form a sealed unit.

Seen in FIG. 4 is a cell detail of two spaced-apart inner walls 18L, 18R which together form housing 14. A matching left 18L and a right inner wall 18R are arranged to interlink. The left inner wall 18L has an upper channel 70 formed in the top 72 of said left inner wall 18L. A thin tongue 74 of the right inner wall 18R is shown engaged in channel 70. The left inner wall 18L has a peripheral frame-like opening 19 extending along both sides and the bottom. The right inner wall 18R is sized to fit into frame-like opening 19 and to be flush, when assembled, with the top edge 76 of frame-like opening 19. The interlinked walls 18L, 18R hold between them air electrodes, the zinc electrode and the electrolyte, as described with reference to FIGS. 2 and 3, but these components, as well as the contact housing 3, are omitted herein for purposes of clarity.

Figure 5:
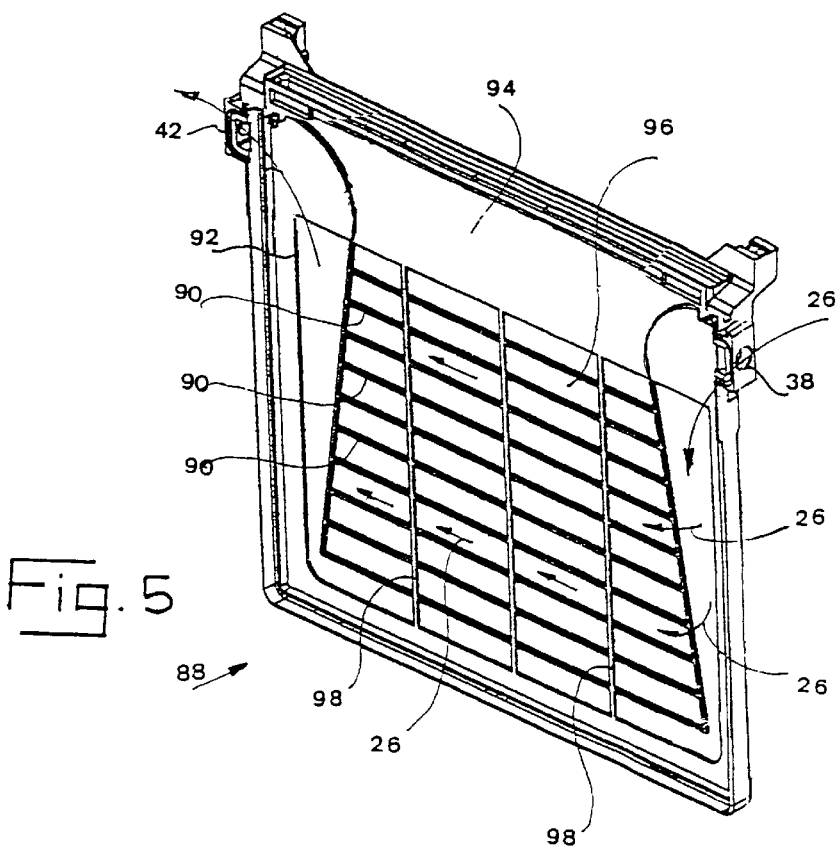
FIG. 5 is a perspective view of an embodiment provided with means for directing the flow of reaction air in a uniform flow distribution across outer faces of the air electrodes.

Seen in FIG. 5 is detail of a cell 88 provided with means for directing the flow of reaction air 26 substantially in a uniform flow distribution across outer faces of both air electrodes 30 seen in FIG. 3.

Said means include a series of substantially horizontal rails 90 is supported in a window-like opening 92 in inner wall 94. The spaces formed between rails 90 define upper and lower walls of horizontal ducts 96 for directing reaction air 26, which is received from first inlet 38. After passing between the rails 90, reaction air 26 is directed towards second outlet 42.

In the shown preferred embodiment, a plurality of webs 98 extend in a vertical direction and interlink and reinforce rails 90. The webs 98 further provide support for air electrodes 30, which are mechanically weak. A further benefit of the webs 98 is in the creation of a more turbulent air flow in horizontal ducts 96, thus improving both cell efficiency and cell cooling.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A modular zinc-air cell for use in a multi-cell metal-air battery comprising
    a housing having two outer major surfaces and two spaced-apart inner walls, said inner walls defining a first inner chamber for containing therein a zinc electrode, and in conjunction with said outer major surfaces defining two outer chambers for receiving reaction air;
    two generally planar, gas-permeable, but liquid-impermeable air electrodes, each of said electrodes being installed in a window-like opening provided in each of said inner walls;
    an electrolyte in contact with said zinc electrode and said air electrodes; and
    means for directing a flow of said reaction air into an inlet provided in a first outer side surface of said housing through both of said outer chambers substantially in a uniform flow distribution across the outer faces of both of said air electrodes, and out of an outlet provided in an opposite outer side surface of said housing.

2. A modular cell according to claim 1, wherein a first of said inner walls is provided with a frame-like opening sized to receive and accommodate, in tight friction fit, a second of said inner walls, a bottom and opposing side surfaces of said first inner wall forming the base and sides of said housing respectively and a top portion of said first inner wall constituting a seamless upper portion of the assembled cell.

3. A modular cell according to claim 1, wherein said cell is provided with a single inlet and a single outlet for reaction air.

4. A modular cell according to claim 1, wherein said outer major surfaces of said cell housing are made of a plastic material.

5. A modular cell according to claim 1, wherein said means for directing said flow of reaction air substantially in a uniform flow distribution across said outer faces of both of said air electrodes comprises a series of substantially horizontal rails supported in said window-like opening in said inner wall, the spaces formed between said rails defining upper and lower walls of horizontal ducts directing said reaction air received from said inlet towards said outlet.

6. A modular cell according to claim 5, further comprising a plurality of webs extending in a vertical direction and interlinking and reinforcing said rails, and further providing support for said air electrodes, while creating a turbulent air flow in said horizontal ducts.

7. A modular cell according to claim 1, wherein each of said inner walls is provided with a peripheral recess sized to accept one of said two outer major surfaces and a window-like opening sized to accept one of said two air electrodes, each of said recesses and each of said openings serving to position one of said electrodes and one of said surfaces and to facilitate the formation of an air-impermeable joint between said outer surfaces and said peripheral recesses.

8. A modular cell according to claim 1, wherein said outer major surfaces are joined to said inner walls by ultrasonic welding.

9. A modular cell according to claim 1, further provided with a manifold arranged to feed reaction air to the sides of each cell.

10. A modular cell according to claim 1, wherein said outer surfaces comprise plastic sheets 0.3 to 1.5 mm thick of sufficient strength for protection of said air electrode from physical damage during cell handling.

11. A modular cell according to claim 1, wherein a first of said inner walls is provided with an integral cell contact housing containing a spring clip contact electrically connected via a metal conductor to contacts of the air electrode, said clip contact being adapted to receive flanges extending from an anode current collector member of an adjacent cell, wherein said integral cell contact housing is provided with a stepped configuration enabling nesting alignment between adjacent cells and the insertion of the flanges of a current collector member of an adjacent cell therein.

12. A modular cell according to claim 11, wherein said integral cell contact housing is sealed by a closure member.

13. A modular cell according to claim 12, wherein said integral cell contact housing and said closure member are formed of non-conductive, KOH-resistant plastic.

* * * * *